US012600602B2

(12) United States Patent
Sefcsik et al.

(10) Patent No.: US 12,600,602 B2
(45) Date of Patent: Apr. 14, 2026

(54) CONNECTING GEAR MECHANISM OF A PASSENGER-TRANSPORTING SYSTEM DESIGNED AS AN ESCALATOR OR MOVING WALKWAY

(71) Applicant: Inventio AG, Hergiswil (CH)

(72) Inventors: Peter Sefcsik, Györ (HU); Hannes Dragsits, Vienna (AT); Christoph Makovec, Wiener Neustadt (AT); Gerhard Kleewein, Pressbaum (AT); Georg Wagenleitner, Roßleithen (AT)

(73) Assignee: Inventio AG, Hergiswil (CH)

( * ) Notice: Subject to any disclaimer, the term of this patent is extended or adjusted under 35 U.S.C. 154(b) by 17 days.

(21) Appl. No.: 18/832,082

(22) PCT Filed: Feb. 15, 2023

(86) PCT No.: PCT/EP2023/053763

§ 371 (c)(1),
(2) Date: Jul. 22, 2024

(87) PCT Pub. No.: WO2023/186396

PCT Pub. Date: Oct. 5, 2023

(65) Prior Publication Data

US 2025/0100851 A1 Mar. 27, 2025

(30) Foreign Application Priority Data

Mar. 31, 2022 (EP) .................................... 22165927

(51) Int. Cl.
*B66B 23/02* (2006.01)

(52) U.S. Cl.
CPC .................................... *B66B 23/02* (2013.01)

(58) Field of Classification Search
CPC ..... B66B 23/02; B66B 23/022; B66B 23/024; B66B 23/026; B66B 23/028
See application file for complete search history.

(56) References Cited

U.S. PATENT DOCUMENTS 2,056,541 A * 10/1936 Shonnard .............. B66B 23/026 198/323
5,224,580 A * 7/1993 Nurnberg .............. B66B 23/026 198/330

(Continued)

FOREIGN PATENT DOCUMENTS

AT 340822 B 1/1978
DE 10030052 A1 1/2002

(Continued)

OTHER PUBLICATIONS

English Translation of the Written Opinion (Year: 2023).*
International Search Report received in International Application No. PCT/EP2023/053763, dated Mar. 27, 2023.

*Primary Examiner* — Mark A Deuble
(74) *Attorney, Agent, or Firm* — Knobbe, Martens, Olson & Bear, LLP

(57) ABSTRACT

The present disclosure relates to a connecting gear mechanism of a passenger-transporting system designed as an escalator or moving walkway. The connecting gear mechanism has a first section and a second section. In the first section, an input shaft and a first gearwheel set are arranged so as to be operatively connected to one another. In the second section, an output shaft and a second gearwheel set are arranged so as to be operatively connected to one another. A connecting shaft connects the two gearwheel sets to one another, wherein, with respect to the connecting shaft axis of rotation, the first section can be connected to the second section at any selectable plane intermediate angles.

20 Claims, 5 Drawing Sheets

(56) References Cited

U.S. PATENT DOCUMENTS

| | | | | |
|---|---|---|---|---|
| 6,273,235 | B1 * | 8/2001 | Inoue | B66B 23/026 198/330 |
| 7,784,598 | B2 * | 8/2010 | Fang | B66B 23/026 198/330 |
| 8,381,894 | B2 * | 2/2013 | Nurnberg | B66B 23/026 198/330 |
| 8,839,942 | B2 * | 9/2014 | Tautz | B66B 25/003 198/323 |
| 2008/0067034 | A1 * | 3/2008 | Illedits | B66B 23/026 198/330 |
| 2018/0118520 | A1 * | 5/2018 | Huang | B66B 23/02 |

FOREIGN PATENT DOCUMENTS

| | | | | | |
|---|---|---|---|---|---|
| EP | 3318529 | A1 | | 5/2018 | |
| EP | 3224188 | B1 | | 1/2019 | |
| JP | 2002362870 | A | * | 12/2002 | B66B 23/026 |
| JP | 2002362874 | A | * | 12/2002 | B66B 23/026 |
| JP | 2006282363 | A | * | 10/2006 | B66B 23/026 |
| RU | 2508242 | C2 | | 2/2014 | |

* cited by examiner

CONNECTING GEAR MECHANISM OF A PASSENGER-TRANSPORTING SYSTEM DESIGNED AS AN ESCALATOR OR MOVING WALKWAY

TECHNICAL FIELD

The present disclosure relates to a connecting gear mechanism of a passenger-transporting system and to a passenger-transporting system designed as an escalator or moving walkway.

SUMMARY

Passenger transport systems such as escalators or moving walkways are often used for transporting large crowds of people. Escalators or moving walkways are therefore often to be found in department stores, airports, railway stations, or underground stations.

Passenger-transporting systems of the aforementioned type have a sturdy load-bearing structure in the form of a support structure in which conveying elements connected to a circulating conveyor belt are movably arranged. In the case of an escalator, this conveyor belt is designed as a step belt and in the case of a moving walkway is designed as a flat pallet belt. Said circulating transport belt is driven by means of a drive arranged in the support structure, which drive has at least one motor, at least one connecting gear, and a drive shaft operatively connected to the motor via the connecting gear. The transport belt is usually guided at an angle of 180° about the drive shaft, so that it can be deflected and driven by the drive shaft. Furthermore, balustrades with movable handrails are usually provided on both sides of the conveyor belt, which balustrades are driven synchronously with the conveyor belt via a handrail drive.

In escalators and moving walkways, where possible the motors and gearing used to drive them must be arranged in the support structure in the space between and beneath the step belt or pallet belt due to the limited space available and for architectural reasons. This also applies to the handrail drive. Due to high loading forces occurring during operation of an escalator or moving walkway and, in particular, acting on the drive shaft of the drive, the surrounding support structure must be particularly sturdy to be able to absorb and support these huge forces acting on the drive.

However, in the case of extra-long escalators and moving walkways, there is insufficient space in the support structure for the drive. RU 2 508 242 C2 therefore proposes a drive frame which is entirely separate from the support structure and on which the drive shaft, the connecting gear mechanism and the motor are arranged. The drive shaft is therefore arranged on the drive frame so that the drive frame and the drive arranged thereon do not have to be designed and built specifically for the system. Such system-specific designs are very expensive. However, the adaptation work will thereby be shifted to regions of the support structure which must be constructed specifically for the system in order to be able to install the passenger-transporting system described above.

In the case of existing building structures in which an old passenger-transporting system is to be replaced by a new passenger-transporting system, it may be necessary to make changes to the building structure or to design regions of the support structure and drive frame specifically for the system in order to be able to install the passenger-transporting system described above. Furthermore, the drive frame and the support structure must be very well anchored in the building structure since enormous tensile forces of the conveyor belt act between the two parts. In addition, the building structure must be designed in this region in such a way that it can adequately support these tensile forces, which are counted among the internal forces of the passenger-transporting system.

The object of the present disclosure is therefore that of creating a cost-effective drive structure, in particular for extra-long escalators with a high vertical rise and for very long moving walkways, which ensures a high degree of flexibility with regard to its installation in the building structure and relieves the building structure of internal forces of the passenger-transporting system.

This object is achieved by a connecting gear mechanism for a passenger-transporting system, which is configured as an escalator or moving walkway, and by a passenger-transporting system comprising said connecting gear mechanism.

The passenger-transporting system is designed as an escalator or moving walkway and has a support structure, a circulating conveyor belt and a drive for driving the conveyor belt. The drive comprises at least one motor, at least one connecting gear mechanism and a drive shaft which is operatively connected to the motor via the connecting gear mechanism. The conveyor belt is guided via the drive shaft and can be moved or driven with the drive shaft. The conveyor belt can be arranged such that it is movably guided within the support structure. In the region of a first end of the support structure, the drive shaft can also be rotatably mounted in the support structure. As a result, the above-described internal forces of the conveyor belt (frictional forces due to the movement, and the mass of the conveyor belt and of the load to be transported) can be supported directly in the support structure. The motor can be arranged on a drive frame that is separate from the support structure.

The connecting gear mechanism can comprise a first section, a second section and a connecting shaft with a connecting shaft axis of rotation. In the first section, an input shaft and a first gearwheel set can be operatively connected to one another. In the operational passenger-transporting system, the input shaft can be directly or indirectly connected to a motor shaft of the motor so as to transmit torque and rotary motion. The first section can comprise a section transition for the connecting shaft, and the input shaft axis of rotation and the connecting shaft axis of rotation provided in the section transition can be arranged in a first axis of rotation plane.

In the second section, an output shaft for driving the drive shaft and a second gearwheel set can be operatively connected to one another. In the operational passenger-transporting system, the output shaft can be directly connected to the drive shaft so as to transmit torque and rotary motion. The second section can have a section transition for the connecting shaft, and the output shaft axis of rotation and the connecting shaft axis of rotation provided in the section transition can be arranged in a second axis of rotation plane.

The first section can be connected to the second section in the region of their section transitions, wherein the connecting shaft can be arranged in the connecting gear mechanism so as to protrude through the two section transitions and connects the first gearwheel set to the second gearwheel set so as to transmit torque and rotary motion. Here, the first axis of rotation plane and the second axis of rotation plane intersect one another along the connecting shaft axis of rotation. The first section can be connected to the second section such that its first axis of rotation plane is at any selectable plane intermediate angle to the second axis of rotation plane.

This design of the connecting gear mechanism can allow a variety of spatial distances between the drive frame and the drive shaft to be bridged using the same components of the connecting gear mechanism, without the need to adapt components of the drive frame or of the support structure. The shortest distance can be set with a plane intermediate angle of 0°, the longest distance with a plane intermediate angle of 180°. By using always the same components, the connecting gear mechanism can be manufactured in large quantities more cost-effectively. This can also reduce necessary conformity tests that need to be carried out for "individual parts".

In one embodiment of the present disclosure, the first gearwheel set, the second gearwheel set and the connecting shaft can have spur gears. With spur gears, very narrow sections can be built which are arranged side by side and connected to one another in the region of the section transitions. For example, the first section may have a first housing section and the second section may have a second housing section in which the gearwheel sets and the shafts are rotatably arranged. The section transitions would then be housing openings through which the connecting shaft protrudes.

In a further embodiment of the present disclosure, the first section and the second section can have a complementary connecting contour in the region of their section transitions. Similarly to a plug and a socket, complementary connecting contours are understood to mean contours that are not identical but are ideally matched to one another. By joining the two sections together with at least one connecting element, a connecting gear mechanism can be created that has a continuous transmission line.

These contours can also contain recesses for additional components such as sealing elements. With reference to the above example, by joining the two housing sections together with at least one connecting element, a closed, fluid-tight gear housing of the connecting gear mechanism can be created in the region of the housing openings. A screw connection, a rivet connection, a clamp connection or an integral bond can be used as the connecting element. Integral bonds can be created by welding, soldering or gluing.

In a further embodiment of the present disclosure, one or each of the gearwheel sets can have a plurality of speed-increasing or-decreasing stages, depending on which gear ratio is desired. The connecting gear mechanism preferably can have a gear ratio of its output shaft to its input shaft in the range of 1:1 to 1:200.

In a further embodiment of the present disclosure, the output shaft of the connecting gear mechanism can be designed as a hollow shaft. This makes it possible to arrange the drive shaft in such a way that it protrudes through the output shaft of the connecting gear mechanism designed as a hollow shaft, and through the second section of the connecting gear mechanism. As a result, the connecting gear can be pivotably mounted in the support structure via the protruding drive shaft. As a result of this design, the connecting gear mechanism or the connecting gear mechanism housing thereof can be ideally decoupled from external forces. In other words, the output shaft of the connecting gear mechanism can have a hole through which the drive shaft can pass. The output shaft with its output spur gear may be divided into two halves (the separating plane comprises the axis of rotation of the output shaft and of the output spur gear), and the connecting gear mechanism housing and the roller bearings can be analogously designed to be divisible in the region of the output shaft. By opening the connecting gear housing at this point and removing the output spur gear wheel, the connecting gear can be removed from the drive shaft without removing the drive shaft from the support structure. However, the drive shaft can also have a shaft end that protrudes laterally from the support structure, onto which the output shaft, designed as a hollow shaft, and thus the connecting gear mechanism can be placed.

In order to prevent the connecting gear mechanism from "co-rotating" with the drive shaft, the connecting gear mechanism can be supported by a torque support on the support structure or on the drive frame. In order to relieve the connection point at the section transitions, the torque support can be preferably arranged with one of its ends on the second section.

In a further embodiment of the present disclosure, the length of the torque support can be adjustable. This is advantageous in that the spatial position of the input shaft of the connecting gear mechanism relative to the drive frame can be precisely adjusted.

In a further embodiment of the present disclosure, an intermediate gear that transmits rotary motion and torque can be arranged on the drive frame between the motor and the connecting gear mechanism. The motor and the intermediate gear can thus be fastened to the drive frame. However, the motor can also be fastened to the drive frame via an intermediate gear housing. The housing of the intermediate gear may also supports the weight force and counter-torques of the motor on the drive frame. Since in both arrangement variants the intermediate gear and the motor can be located outside the support structure, accessibility for maintenance work may be very effectively guaranteed.

The intermediate gear can be preferably a hypoid gear, a hypoid spur gear, or a worm gear. A hypoid spur gear can be an at least two-stage gear having a hypoid gear stage and a spur gear stage. Such gears may allow for easily arranging a drive axle of the motor in the longitudinal extent of the passenger transport system so that, with regard to a width of the support structure, two motors can be arranged next to one another, if required. Moreover, the design of the intermediate gear as a worm gear, hypoid spur gear, or hypoid gear in a minimum of space may allow for a high gear ratio in the range of 1:5 to 1:40. The feature "longitudinal extension of the passenger-transporting system" defines an extension direction of the passenger-transporting system that includes the two most distant physical points of the passenger-transporting system.

In another embodiment of the present disclosure, the connecting gear mechanism and the intermediate gear can be connected to one another via a resilient coupling so as to transmit torque. This may have the advantage that vibrations in the drive train are damped. Moreover, axle errors between the gear shafts of the two gears to be connected to one another can also be compensated by the elastic coupling. The elastic coupling may be for example a claw coupling or pin coupling with elastic intermediate elements made of metal or plastic.

In a further embodiment of the present disclosure, an auxiliary motor can be arranged on the drive frame, which can be coupled to the input shaft of the intermediate gear or to a motor shaft of the motor with a clutch gear. The auxiliary motor can be provided to move the conveyor belt at a very slow speed during maintenance work.

A plurality of passenger-transporting systems can also be arranged in parallel in a building structure and, for example, can connect the same levels of the building structure to one another. In such an arrangement, for example, two passenger-transporting systems of the aforementioned type can be provided, wherein the support structures of both passenger-transporting systems may be arranged in parallel with one another in the building structure and their drive frames may be arranged offset from one another in the longitudinal extension of the passenger-transporting systems. This offset of the drive frames can facilitate access to the components of the drive, whereby the different distances between the drive shafts and the drive frames can be easily bridged by the connecting gear mechanism according to the present disclosure.

If, for reasons of accessibility during maintenance, an offset is also required between the two drive shafts, an arrangement of two passenger-transporting systems of the aforementioned type can also be configured in such a way that not only the support structures of both passenger-transporting systems but also their drive frames can be arranged in the building structure so as to be offset from one another in the longitudinal extension of the passenger-transporting systems. Different distances between the drive shafts and the drive frames, which arise, for example, due to on-site deviations from the elevation plan of the building structure, can also be easily bridged by the connecting gear mechanism according to the present disclosure.

BRIEF DESCRIPTION OF THE DRAWINGS

Embodiments of the present disclosure will be described herein with reference to the accompanying drawings, wherein neither the drawings nor the description are intended to be interpreted as limiting the present disclosure. Identical or equivalent features have the same reference signs. In the drawings.

The figures are merely schematic and not true to scale. In the different figures, identical reference signs denote identical or similar features.

DETAILED DESCRIPTION

Figure 1:
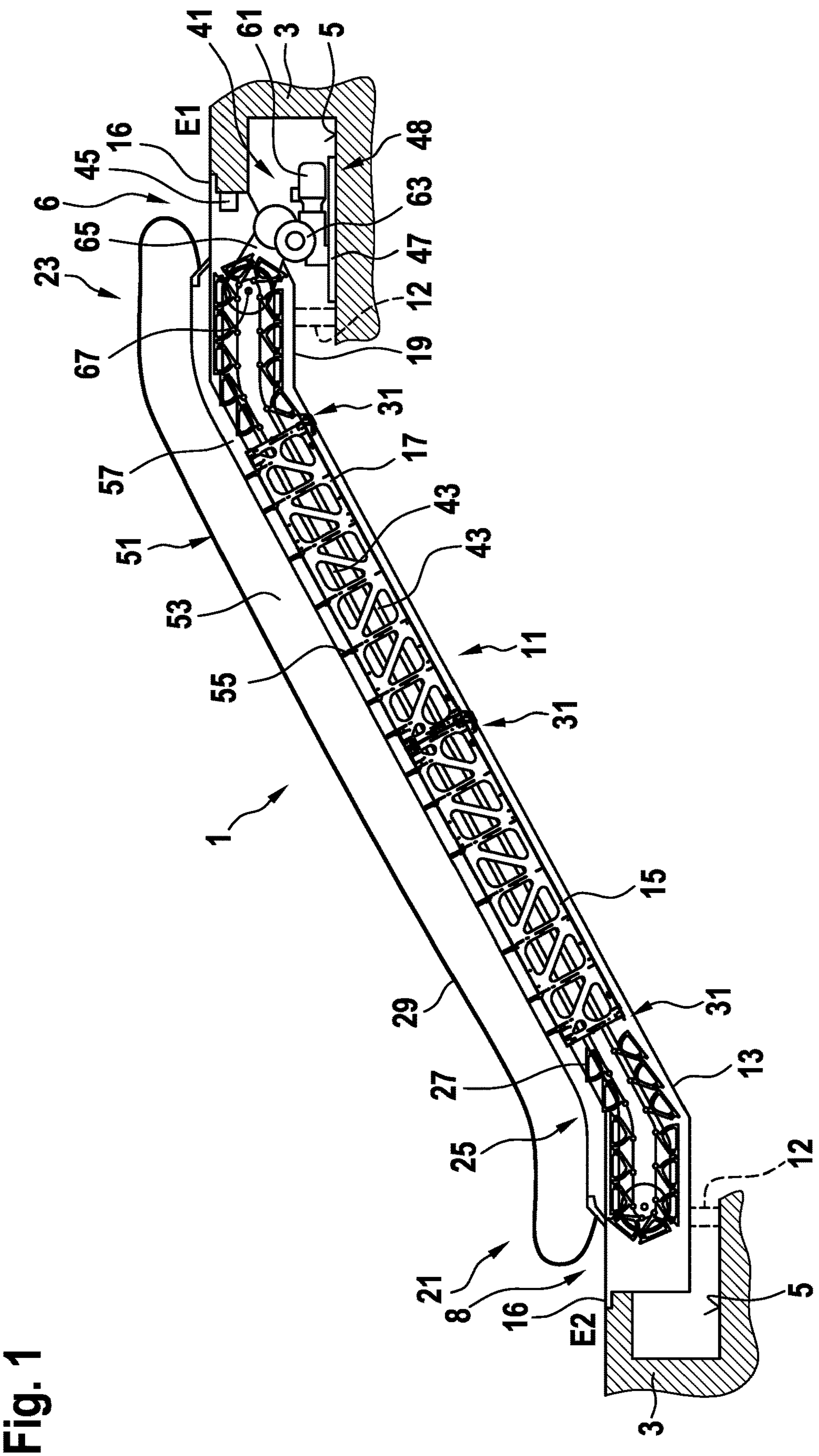
FIG. 1: is a schematic side view of a passenger-transporting system according to the present disclosure, comprising a support structure, a drive frame and a drive, which drive has a drive shaft, a connecting gear mechanism, an intermediate gear and a motor.

FIG. 1 shows a schematic side view of a passenger transport system 1 configured as an escalator, which connects a first level E1 to a second level E2 of a building structure 3. The passenger transport system 1 has a support structure 11 composed of four support structure modules 13, 15, 17, 19 that are connected in series with one another. A first end 6 and a second end 8 of the support structure 11 are each supported on the levels E1, E2 via a support bracket 16 arranged on the end face. The first end 6 and the second end 8 can also be supported on the floor 5 of the building structure 3 with a support 12 arranged on the floor of the support structure 11 instead of via a support bracket 16.

The first support structure module 13 arranged in level E2 has an access region 21. The fourth support structure module 19 also has an access region 23 and is arranged in level E1. The second support structure module 15 and the third support structure module 17 are arranged between, and connect, the first support structure module 13 and the fourth support structure module 19. For the sake of clarity, only the outlines of the first and fourth support structure modules 13, 19 have been shown. The second and third support structure modules 15, 17 are shown in more detail and have an identical structure in the present example. The support structure modules 13, 15, 17, 19 are connected to one another via connection points 31. Releasable connecting means, such as high-strength bolts, are usually used for this purpose.

The passenger-transporting system 1 also comprises a drive frame 47 and a drive 41. The drive 41 comprises a drive shaft 67, a connecting gear mechanism 65, an intermediate gear 63 and a motor 61. The drive frame 47 is separate from the support structure 11 and fastened to the floor 5 of the building structure 3 by anchor bolts 48 (see also FIG. 4). The drive 41 is arranged between the support structure 11 and the drive frame 47, wherein the drive shaft 67 is rotatably mounted in the support structure 11, the motor 61 and the intermediate gear 63 are fastened to the drive frame 47, and the connecting gear mechanism 65 connects the intermediate gear 63 to the drive shaft 67 so as to transmit torque and rotary motion.

The support structure 11 can bear the load of all remaining components of the passenger transport system 1 and can support them on the building structure 3. Such components are, for example, guide rails 44 and a controller 45 for controlling the drive 41. Furthermore, a conveyor belt 25 is arranged in the support structure 11. The conveyor belt 25 of the passenger-transporting system 1 designed as an escalator comprises steps 27. In the case of a moving walkway, the transport belt 25 could have pallets instead of steps 27. The transport belt 25 can be guided by the guide rails 43 such as to move in a circular manner and can be driven by the drive 41.

In other words, the drive shaft 67 can be operatively connected to the motor 61 via the connecting gear mechanism 65 and the intermediate gear 63. The conveyor belt 25, which can be movably arranged in the support structure 11, can be guided via the drive shaft 67 and can be driven and deflected thereby.

Two balustrades 51 (only one of the two balustrades 51 is visible due to FIG. 1 being shown in side view) that can be assembled from balustrade components 53, 55, 57 are erected above the support structure 11, wherein the balustrades 51 are arranged on both sides of the conveyor belt 25 and can be fastened to the support structure 11 by fastening flanges 55. A handrail 29 is arranged on each of the two balustrades 51 such as to move in a circular manner. The two handrails 29 can be driven synchronously with the conveyor belt 25. This can be done with a handrail drive (not shown) that is autonomous in relation to the drive 41 or with a handrail drive wheel (not shown) that is connected to the drive 41 so as to transmit torque and rotary motion.

Figure 2:
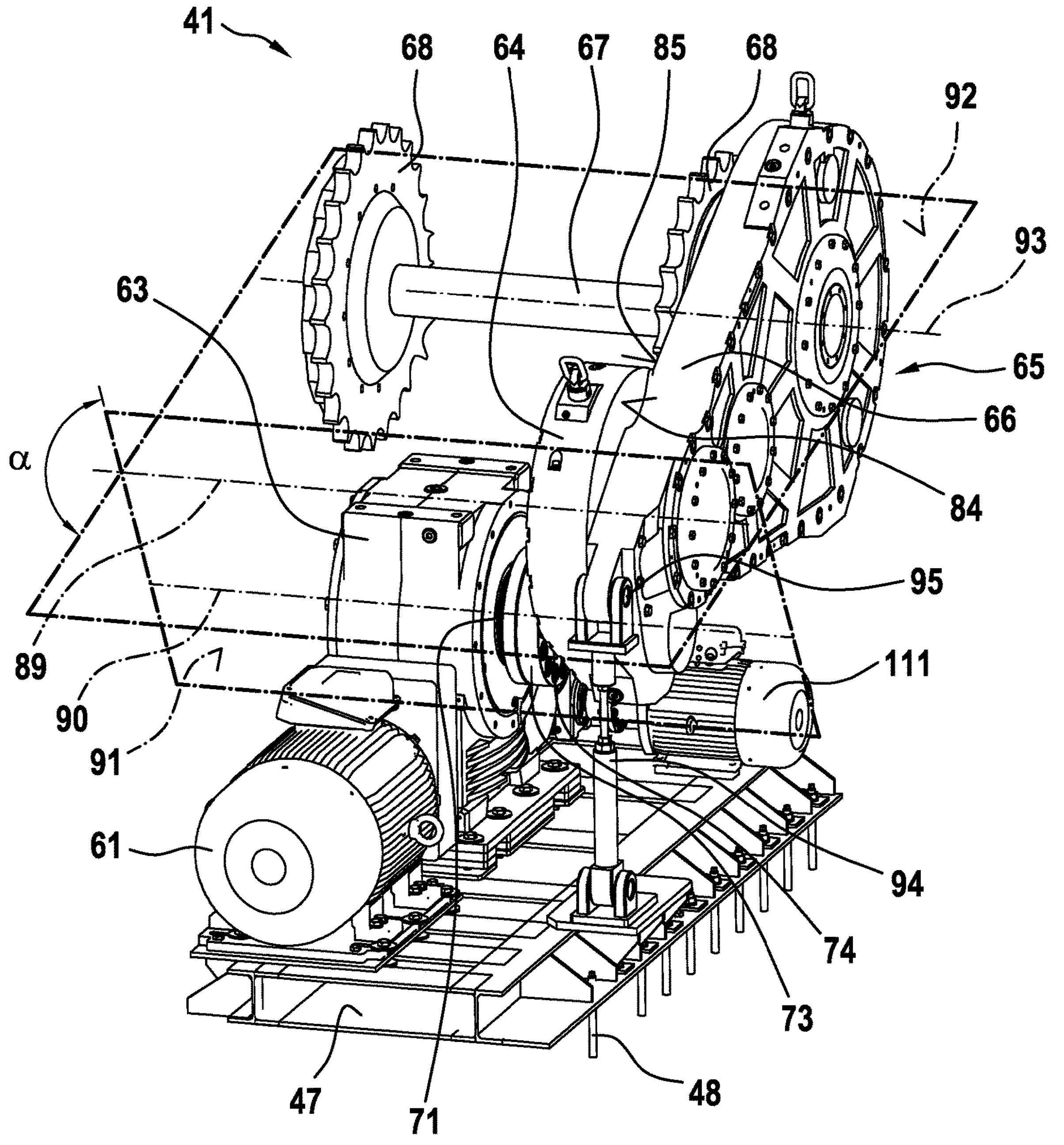
FIG. 2: is an enlarged, three-dimensional view of the drive from FIG. 1, whereby for reasons of clarity the support structure and other components of the passenger-transporting system arranged thereon and therein are not shown.

FIG. 2 is an enlarged three-dimensional view of the drive 41 from FIG. 1. The motor 61 and intermediate gear 63 thereof can fastened to the drive frame 47. As already explained with regard to FIG. 1, the drive shaft 67 of the drive 41 can be rotatably mounted on the support structure 11 and the connecting gear mechanism 65 of the drive 41 connects the motor 61 to the drive shaft 67 via the intermediate gear 63 so as to transmit torque and rotary motion. For reasons of clarity, the support structure 11 and other components of the passenger-transporting system 1 arranged therein and thereon have not been shown. The conveyor belt 25 has also been omitted so that the two chain wheels 68 of the drive shaft 67 can be seen, which can positively engage in the conveyor chains of the conveyor belt 25.

Figure 3:
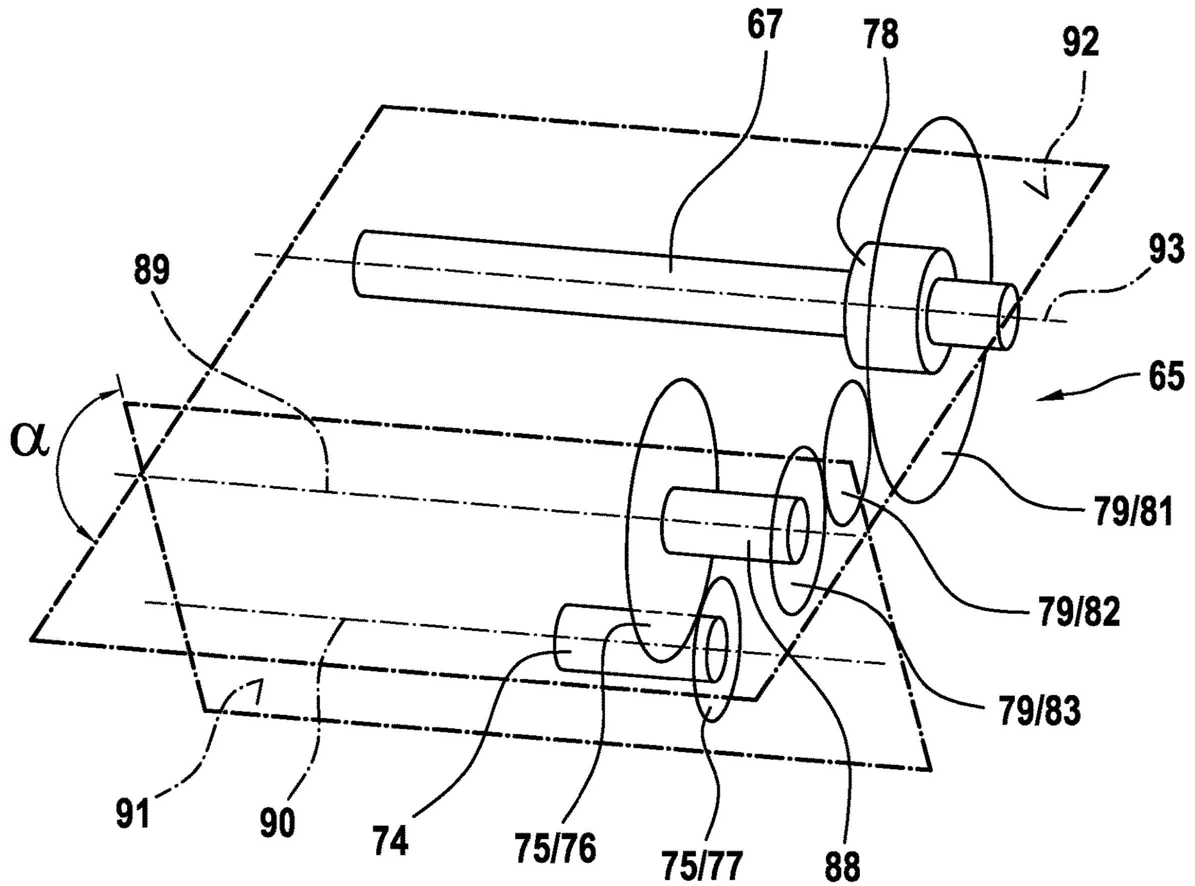
FIG. 3: is a schematic three-dimensional view of the inner movable components of the connecting gear mechanism from FIG. 2 and their spatial arrangement relative to one another.
Figure 4:
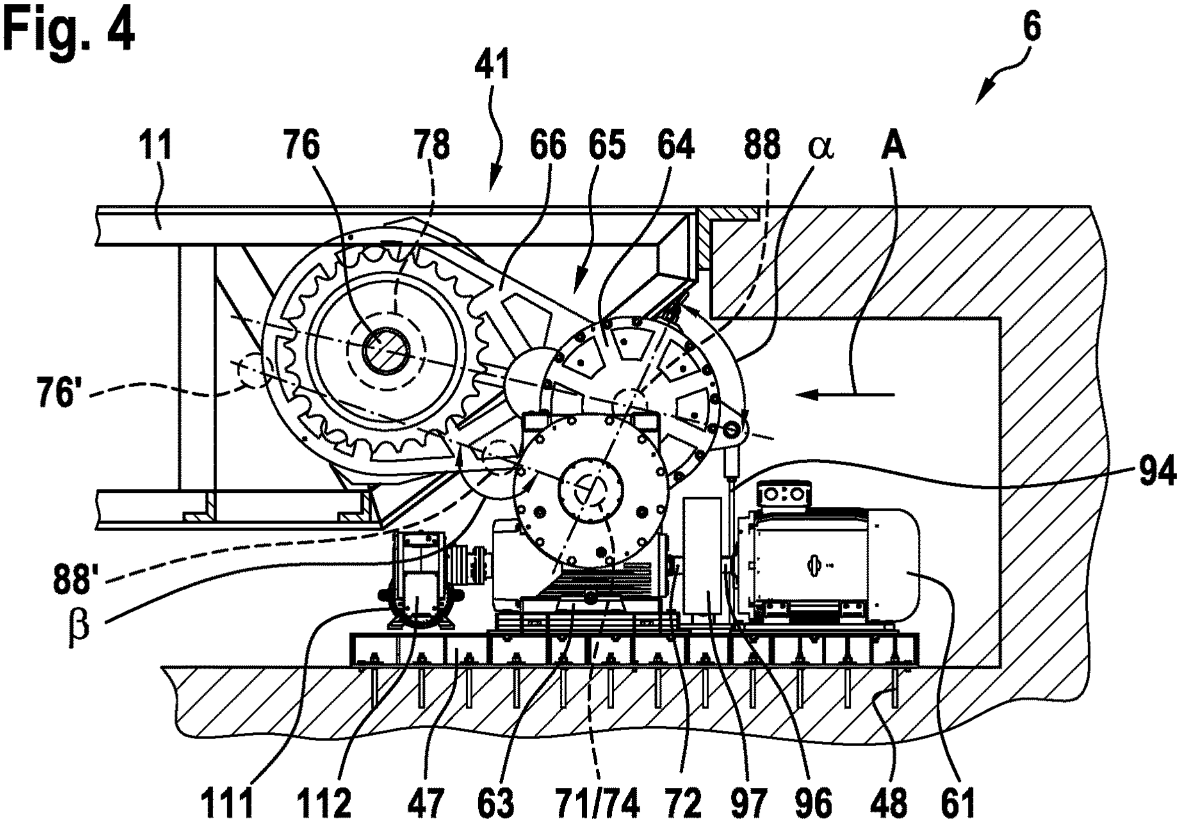
FIG. 4: is an enlarged side view of a first end of the support structure shown in FIG. 1, in the region of which the drive and the drive frame are arranged.

FIG. 3 is a schematic three-dimensional view of the drive shaft 67, as well as inner movable components of the connecting gear mechanism 65 from FIG. 2 and their spatial arrangement relative to one another. FIG. 4 is a sectional, enlarged side view of the first end 6 of the support structure 11 shown in FIG. 1, in the region of which the drive 41 and the drive frame 47 are arranged. Hereinafter FIGS. 2 to 4 are described together.

As FIG. 4 best shows, a motor shaft 96 of the motor 61 is connected via a service brake 97 to an input shaft 72 of the intermediate gear 63 so as to transmit torque and rotary motion. The intermediate gear 63 can be a hypoid gear, a hypoid spur gear or a worm gear and can have a gear ratio of its output shaft 71 to its input shaft 72 in the range of 1:5 to 1:40. The connecting gear mechanism 65 and the intermediate gear 63 are connected to one another via a resilient coupling 73 so as to transmit rotary motion and torque.

As FIGS. 2 to 4 show, the connecting gear mechanism 65 has a first section 64 in which an input shaft 74 and a first gearwheel set 75 with two gears 76, 77 are arranged so as to be operatively connected to one another. The connecting gear mechanism 65 also has a second section 66 in which an output shaft 78 and a second gearwheel set 79 with three gears 81, 82, 83 are arranged so as to be operatively connected to one another.

Figure 5:
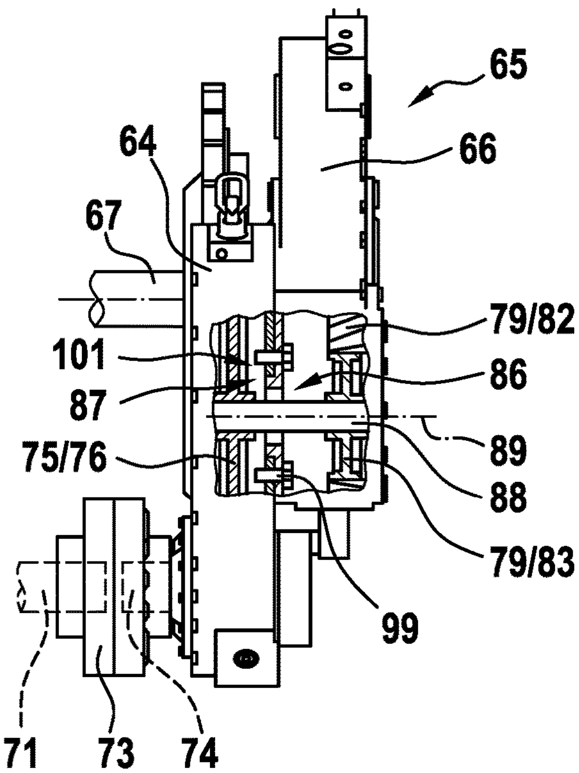
FIG. 5: shows the detailed view of the connecting gear mechanism marked "A" in FIG. 4.

The first section 64 and the second section 66 can be fixedly connected to one another at facing side surfaces 84, 85, preferably with releasable connecting elements 99 (see FIG. 5). Each section 64, 66 has a section transition 86, 87 in these side surfaces 84, 85, wherein the two section transitions 86, 87 can be aligned with one another when the two sections 64, 66 are assembled. The connecting gear mechanism 65 further comprises a connecting shaft 88 with a connecting shaft axis of rotation 89, wherein the connecting shaft 88 is arranged in both sections 64, 66 so as to protrude through the section transitions 86, 87. An input shaft axis of rotation 90 of the input shaft 74 and the connecting shaft axis of rotation 89 are arranged in a first axis of rotation plane 91. Similarly, an output shaft axis of rotation 93 of the output shaft 78 and the connecting shaft axis of rotation 89 are also arranged in a second axis of rotation plane 92. For better spatial orientation, both axis of rotation planes 91, 92 are shown in both FIGS. 2 and 3.

The connecting shaft 88 not only protrudes through both section transitions 86, 87, but also connects the first gearwheel set 75 to the second gearwheel set 79 so as to transmit torque and rotary motion. Since the connecting shaft axis of rotation 89 is arranged in both axis of rotation planes 91, 92, the two axis of rotation planes 91, 92 of the assembled connecting gear mechanism 65 can intersect along the connecting shaft axis of rotation 89. As a result, the first section 64 can be connected to the second section 66 such that its first axis of rotation plane 91 is at any selectable plane intermediate angle $\alpha$ to the second axis of rotation plane 92. By changing the plane intermediate angle $\alpha$, for example, to the plane intermediate angle $\beta$ (see FIG. 4), the position of the drive shaft 67 in relation to the input shaft 74 can be adjusted as desired using the same gear mechanism components. This is shown by way of example in FIG. 4 by the drive shaft 76' indicated. The greatest possible distance between the input shaft 74 and the drive shaft 67 can be achieved when the plane intermediate angle $\beta$=180° and the axis of rotation 93 of the output shaft 78, the connecting shaft axis of rotation 89 and the axis of rotation 90 of the input shaft 74 lie in a common plane.

As symbolically shown in FIG. 3 using pitch circles, the first gearwheel set 75 and the second gearwheel set 79 can have spur gears 76, 77, 81, 82, 83. These spur gears 76, 77, 81, 82, 83 can have straight teeth, helical teeth or herringbone teeth. The arrangement shown is merely an example; depending on the desired gear ratio, the first gearwheel set 75 and/or the second gearwheel set 79 can have a plurality of gear stages. The connecting gear mechanism 65 can therefore have a gear ratio of its output shaft 78 to its input shaft 74 in the range of 1:1 to 1:200.

FIG. 3 also shows how the connecting gear mechanism 65 and the drive shaft 67 are connected to one another so as to transmit torque and rotary motion. For this purpose, the output shaft 78 of the connecting gear mechanism 65 is designed as a hollow shaft so that the drive shaft 67 can be arranged to protrude through the output shaft 78 and through the second section 66 of the connecting gear mechanism 65.

In other words, the output shaft 78 can be placed on the drive shaft 67. In order to transmit the high torque acting here from the output shaft 78 to the drive shaft 67, known elements such as teeth, wedges, flanges, pins and the like can be provided between the drive shaft 67 and the output shaft 78. Due to the arrangement described above, the connecting gear mechanism 65 can be pivotally mounted in the support structure 11 with the protruding drive shaft 67. To ensure that no reaction forces act on the resilient coupling 73 during operation, the second section 66 has a fastening eye 95, between which eye and the drive frame 47 a torque support 94 is arranged. The length of the torque support 94 is adjustable so that the input shaft 74 can be adjusted to align with the resilient coupling 73.

In addition, an auxiliary motor 111 is arranged on the drive frame 47 and can be coupled to the input shaft 72 of the intermediate gear 63 with a clutch gear 112. If necessary, the auxiliary motor 111 can also be coupled to the motor shaft 96 of the motor 61. The auxiliary motor 111 can be provided to move the unloaded conveyor belt 25 at very low speed during maintenance work.

FIG. 5 shows the detailed view of the connecting gear mechanism 65 designated "A" in FIG. 4 and in particular a partial section through the two sections 64, 66 in the region of the connecting shaft 88, or in the region of the section transitions 86, 87. In addition to the connecting shaft 88, spur gears 76, 82, 83 of the first gearwheel set 75 and the second gearwheel set 79 can also be seen. The spur gear 82, which is not located in the intersection plane, can have, for example, helical teeth.

As shown, the first section 64 and the second section 66 have a complementary connecting contour 101 in the region of their section transitions 86, 87. By joining the two sections 64, 66 together with at least one connecting element 99, a closed, fluid-tight housing of the connecting gear mechanism 65 can be created in the region of the section transitions 86, 87. Of course, other complementary connecting contours 101 can also be provided, for example with an annular groove (not shown) surrounding the section transitions 86, 87, in which a groove sealing ring can be inserted and can be clamped between sealing surfaces. A sealant such as a curing or non-curing silicone compound can also be used. The sealant can be inserted between the contact surfaces of the two sections 64, 66 during assembly. In the present embodiment, screws are used as connecting elements 99. Depending on the design of the complementary connecting contour 101, a clamp connection or an integral bond can also be used.

Figure 6:
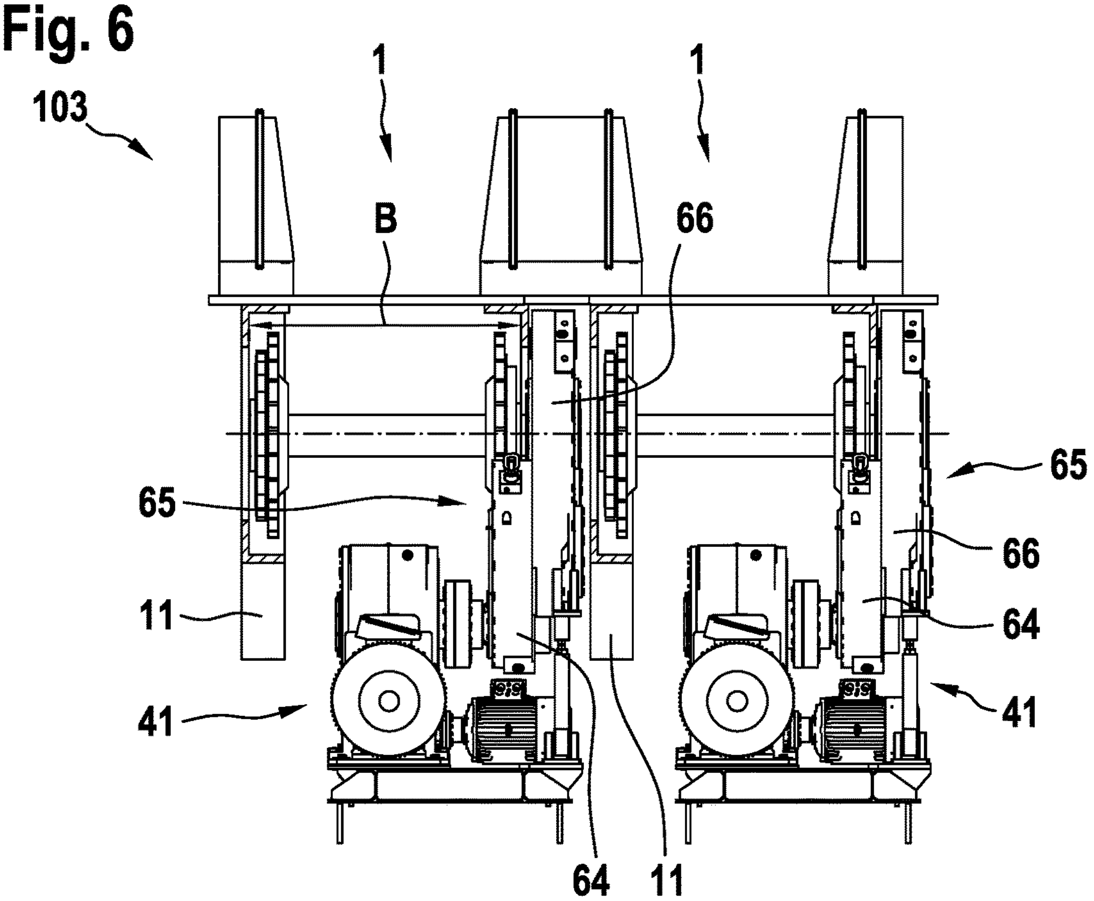
FIG. 6: shows a first possible arrangement of two adjacent passenger-transporting systems.
Figure 7:
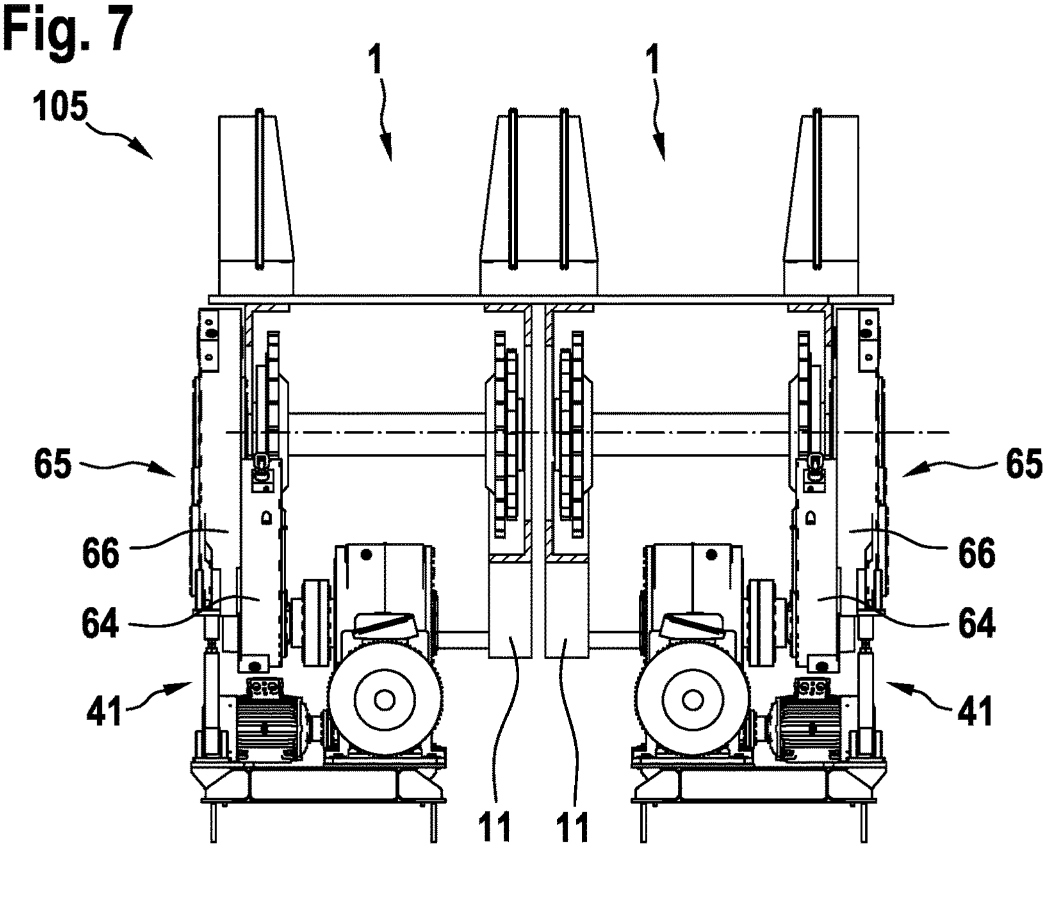
FIG. 7: shows a second possible arrangement of two adjacent passenger-transporting systems.

Further advantages of the connecting gear mechanism 65 according to the present disclosure will be described with reference to FIGS. 6 and 7, wherein FIG. 6 shows a first possible arrangement 103 of two adjacent passenger-transporting systems 1 and FIG. 7 shows a second possible arrangement 105 of two adjacent passenger-transporting systems 1.

The first arrangement 103 already shows the great advantage of the second section 66, which is very flat due to spur gears, can be arranged outside the support structure 11 and may require only a little extra space to the side in the region of the drive 41. The first section 64 may be arranged within a width B of the support structure 11 so that additional space may not be required to the side of the building structure here either. The support structures 11 of the two passenger-transporting systems 1 can be arranged quite close to one another.

The second arrangement 105 shows an even smaller distance between the two support structures 11 arranged next to one another. Since the first section 64 can be arranged at any plane intermediate angle α, β in relation to the second section 66, "mirror-inverted" connecting gear mechanisms 65 can also be assembled using the same connecting gear mechanism components. Supporting structures 11 arranged close together have the great advantage that, for example, when subway stations are built, less wide tunnels or shafts need to be excavated for the passenger-transporting systems 1. This has a huge cost saving. In addition, in an existing shaft, instead of three existing passenger-transporting systems (as disclosed, for example, in RU 2 508 242 C2), four new passenger-transporting systems 1 according to the second arrangement 105 can be installed without the need to widen the shaft.

In the aforementioned arrangements 103, 105, the support structures 11 of both passenger-transporting systems 1 can be parallel to one another in the building structure 3. However, their drive frames 47 can be arranged offset from one another in the longitudinal extension of the passenger-transporting systems 1. This offset of the drive frames 47 may facilitate access to the components of the drive 41, whereby the different distances between the drive shafts 67 and the drive frames 47 can be easily bridged by the connecting gear mechanism 65 according to the present disclosure.

If, for reasons of accessibility during maintenance, an offset is also required between the two drive shafts 67, an arrangement 103, 105 of two passenger-transporting systems 1 of the aforementioned type can also be designed such that not only the support structures 11 of the two passenger-transporting systems 1 but also their drive frames 47 are arranged in the building structure 3 offset from one another in the longitudinal extension of the passenger-transporting systems 1. Different distances between the drive shafts 67 and the drive frames 47, which arise, for example, due to on-site deviations from the elevation plan of the building structure 3, can also be easily bridged by the connecting gear mechanism 65 according to the present disclosure.

Although FIGS. 1 to 7 exclusively show passenger-transporting systems 1 configured as escalators, it is obvious that the connecting gear mechanism 65 according to the present disclosure and the drive 41 created thereby can equally be used in moving walkways. Finally, it should be noted that terms such as "having," "comprising," etc., do not preclude other elements or steps, and terms such as "a" or "one" do not preclude a plurality. Reference signs in the claims should not be considered to be limiting.

The invention claimed is:

1. A connecting gear mechanism of a passenger-transporting system configured as an escalator or moving walkway, wherein the connecting gear mechanism and a motor can be operatively coupled to a drive shaft of the passenger-transporting system, the connecting gear mechanism comprising:

- a connecting shaft comprising a connecting shaft axis of rotation;
- a first section comprising:
  - a first section transition;
  - an input shaft comprising an input shaft axis of rotation; and
  - a first gearwheel set arranged in the first section to be operatively coupled to the input shaft,
- wherein the input shaft axis of rotation and the connecting shaft axis of rotation are positioned in the first section transition and are arranged in a first axis of rotation plane; and
- a second section comprising:
  - a second section transition;
  - an output shaft configured to drive the drive shaft, the output shaft comprising an output shaft axis of rotation; and
  - a second gearwheel set arranged in the second section to be operatively coupled to the output shaft,
- wherein the output shaft axis of rotation and the connecting shaft axis of rotation are positioned in the second section transition and are arranged in a second axis of rotation plane,
- wherein the first section is coupled to the second section via the first section transition and second section transition, and wherein, the connecting shaft is arranged in the connecting gear mechanism so as to protrude through both the first section transition and second section transition in order to couple the first gearwheel set to the second gearwheel set such that the connecting shaft is configured to transmit torque and rotary motion, and wherein the first axis of rotation plane intersects the second axis of rotation plane along the connecting shaft axis of rotation, and wherein the first section is coupled to the second section such that the first axis of rotation plane is at any selectable plane intermediate angle to the second section.

2. The connecting gear mechanism of claim 1, wherein the first gearwheel set and the second gearwheel set comprise spur gears.

3. The connecting gear mechanism of claim 1, wherein the first section and the second section comprise a complementary connecting contour in a region of the first section transition and second section transition respectively and by joining the first section and the second section together with at least one connecting element, a connecting gear mechanism can be created which comprises a continuous transmission line.

4. The connecting gear mechanism of claim 2, wherein the first section and the second section comprise a complementary connecting contour in the region of the first section transition and second section transition respectively and by joining the first section and the second section together with at least one connecting element, a connecting gear mechanism can be created which comprises a continuous transmission line.

5. The connecting gear mechanism of claim 3, wherein the at least one connecting element is a screw connection, a clamp connection or an integral bond.

6. The connecting gear mechanism of claim 1, wherein the connecting gear mechanism has a gear ratio of its output shaft to its input shaft in a range of 1:1 to 1:200.

7. The connecting gear mechanism of claim 2, wherein the connecting gear mechanism has a gear ratio of its output shaft to its input shaft in a range of 1:1 to 1:200.

8. A passenger-transporting system configured as an escalator or moving walkway; the passenger-transporting system comprising a support structure, a circulating conveyor belt and a drive configured to drive the circulating conveyor belt, wherein the drive comprises at least one motor, at least one connecting gear mechanism of claim 1 and a drive shaft which is operatively coupled to the motor via the connecting gear mechanism, wherein the circulating conveyor belt is movably arranged in the support structure and is guided via the drive shaft and is movable with the drive shaft; wherein the drive shaft is rotatably mounted in the support structure and the motor is arranged on a drive frame separate from the support structure in a region of a first end of the support structure.

9. The passenger-transporting system of claim 8, wherein the output shaft of the connecting gear mechanism is configured as a hollow shaft and the drive shaft protrudes through the output shaft and the second section of the connecting gear mechanism; the connecting gear mechanism is pivotally mounted in the support structure by the protruding drive shaft and the connecting gear mechanism is supported on the support structure or on the drive frame via a torque support.

10. The passenger-transporting system according to claim 9, wherein a length of the torque support is adjustable.

11. The passenger-transporting system of claim 8, wherein a rotary motion- and torque-transmitting intermediate gear is arranged on the drive frame between the motor and the connecting gear mechanism.

12. The passenger-transporting system of claim 9, wherein a rotary motion- and torque-transmitting intermediate gear is arranged on the drive frame between the motor and the connecting gear mechanism.

13. The passenger-transporting system of claim 11, wherein the intermediate gear is a hypoid gear, a hypoid spur gear or a worm gear and has a gear ratio of its output shaft to its input shaft in a range of 1:5 to 1:40.

14. The passenger-transporting system of claim 11, wherein the connecting gear mechanism and the intermediate gear are coupled to one another so as to transmit torque and rotary motion via a resilient coupling.

15. The passenger-transporting system of claim 11, wherein an auxiliary motor is arranged on the drive frame, which can be coupled with a clutch gear to the input shaft of the intermediate gear or to a motor shaft of the motor.

16. The passenger-transporting system of claim 9, wherein an auxiliary motor is arranged on the drive frame, which can be coupled with a clutch gear to the input shaft of the intermediate gear or to a motor shaft of the motor.

17. An arrangement of two passenger-transporting systems of claim 8, wherein the support structures of the two passenger-transporting systems are arranged in parallel with one another in a building structure and their drive frames are arranged offset from one another in the longitudinal extension of the passenger-transporting systems.

18. An arrangement of two passenger-transporting systems of claim 9, wherein the support structures of the two passenger-transporting systems are arranged in parallel with one another in a building structure and their drive frames are arranged offset from one another in the longitudinal extension of the passenger-transporting systems.

19. An arrangement of two passenger-transporting systems of claim 8, wherein the support structures of the two passenger-transporting systems and their drive frames are arranged in a building structure offset from one another in the longitudinal extension of the passenger-transporting systems.

20. An arrangement of two passenger-transporting systems of claim 9, wherein the support structures of the two passenger-transporting systems and their drive frames are arranged in a building structure offset from one another in the longitudinal extension of the passenger-transporting systems.

* * * * *